US012585439B2

(12) United States Patent
Watson et al.

(10) Patent No.: US 12,585,439 B2
(45) Date of Patent: Mar. 24, 2026

(54) METHOD AND SYSTEM FOR CODE GENERATION BY LARGE LANGUAGE MODELS

(71) Applicant: JPMorgan Chase Bank, N.A., New York, NY (US)

(72) Inventors: William Watson, Long Beach, NY (US); Naan Cho, New York, NY (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 354 days.

(21) Appl. No.: 18/205,719

(22) Filed: Jun. 5, 2023

(65) Prior Publication Data

US 2024/0319970 A1 Sep. 26, 2024

Related U.S. Application Data

(60) Provisional application No. 63/453,866, filed on Mar. 22, 2023.

(51) Int. Cl.
*G06F 8/35* (2018.01)
*G06F 21/60* (2013.01)
(52) U.S. Cl.
CPC .............. *G06F 8/35* (2013.01); *G06F 21/604* (2013.01)

(58) Field of Classification Search
CPC ................................. G06F 21/604; G06F 8/35
USPC ......................................................... 717/109
See application file for complete search history.

(56) References Cited

U.S. PATENT DOCUMENTS

| | | | |
|---|---|---|---|
| 2007/0005637 A1* | 1/2007 | Juliano .................. | G06Q 10/10 707/999.102 |
| 2021/0232920 A1* | 7/2021 | Parangi ................ | G06N 3/0455 |
| 2024/0028312 A1* | 1/2024 | Gillman ............... | G06N 3/0455 |

* cited by examiner

*Primary Examiner* — Hanh Thi-Minh Bui
(74) *Attorney, Agent, or Firm* — Greenblum & Bernstein, P.L.C.

(57) ABSTRACT

A method for using a large language model (LLM) to generate executable code in a manner that preserves privacy and confidentiality of proprietary data is provided. The method includes: receiving information that relates to a summarization of a data table; defining a set of rules for facilitating a generation of executable code by an LLM; receiving an inquiry from a user; inputting each of the summarization information, the set of rules, and the inquiry into the LLM; receiving, in response to the input, a set of executable code that is generated by the LLM; and executing the set of executable code in order to generate an output. The summarization information may be received from an external source that has access to proprietary data included in the data table, and the summarization information may be structured so as to preserve a privacy of the proprietary data.

13 Claims, 9 Drawing Sheets

400

Receive Summarization of Sensitive Data
S402

Define Rules for Facilitating Generation of Executable
Code by Large Language Model (LLM)
S404

Receive User Inquiry and Revise Based on Rules
S406

Input Summarization of Sensitive Data, Rules, and Inquiry into LLM
S408

Receive Executable Code Generated by LLM
S410

Execute Code to Generate Output
S412

900

METHOD AND SYSTEM FOR CODE GENERATION BY LARGE LANGUAGE MODELS

CROSS-REFERENCE TO RELATED APPLICATIONS

This application claims priority benefit from U.S. Provisional Application No. 63/453,866, filed Mar. 22, 2023, which is hereby incorporated by reference in its entirety.

BACKGROUND

1. Field of the Disclosure

This technology generally relates to methods and systems for generating executable code, and more particularly to methods and systems for using a large language model to generate executable code in a manner that preserves privacy and confidentiality of proprietary data.

2. Background Information

Financial institutions house a multitude of private, confidential, and proprietary data regarding clients and employees. Safekeeping of this data is of high priority and paramount importance for any such financial institution. In particular, with the advent of multiple large language models (LLMs), and the readily available nature thereof, data security is of primary concern.

Accordingly, there is a need for a mechanism for using a large language model to generate executable code in a manner that preserves privacy and confidentiality of proprietary data.

SUMMARY

The present disclosure, through one or more of its various aspects, embodiments, and/or specific features or sub-components, provides, inter alia, various systems, servers, devices, methods, media, programs, and platforms for methods and systems for using a large language model to generate executable code in a manner that preserves privacy and confidentiality of proprietary data.

According to an aspect of the present disclosure, a method for generating executable code is provided. The method is implemented by at least one processor. The method includes: receiving, by the at least one processor, first information that relates to a summarization of a first data table; defining, by the at least one processor, a first set of rules for facilitating a generation of executable code by a language model; receiving, by the at least one processor, an inquiry from a user; inputting, by the at least one processor, each of the first information, the first set of rules, and the inquiry into the language model; receiving, by the at least one processor in response to the inputting, a first set of executable code that is generated by the language model; and executing, by the at least one processor, the first set of executable code in order to generate an output.

The first information may be received from an external source that has access to proprietary data included in the first data table.

The first information may be structured so as to preserve a privacy of the proprietary data.

The first information may include a respective textual description of each of a plurality of sections of the first data table.

The first set of rules may include at least one from among a programming language of the executable code, a library to be used in conjunction with the executable code, a syntax consideration, and information that relates to a format of the output that reflects an intent of the user.

The method may further include revising the inquiry based on at least one from among the first set of rules. The inputting may further include inputting the revised inquiry into the language model.

The output may include at least one from among a second data table, a sunburst chart, a bar chart, a pie chart, an aggregated answer, a web page, a user interface, a slide presentation, a dashboard, and a document.

The executing of the first set of executable code may cause a generation of at least one from among an intermediate representation of the output and a data structure that corresponds to the output.

The method may further include displaying the output on a display via a graphical user interface (GUI).

According to another exemplary embodiment, a computing apparatus for generating executable code is provided. The computing apparatus includes a processor; a memory; a display; and a communication interface coupled to each of the processor, the memory, and the display. The processor is configured to: receive, via the communication interface, first information that relates to a summarization of a first data table; define a first set of rules for facilitating a generation of executable code by a language model; receive, via the communication interface, an inquiry from a user; input each of the first information, the first set of rules, and the inquiry into the language model; receive, in response to the input via the communication interface, a first set of executable code that is generated by the language model; and execute the first set of executable code in order to generate an output.

The first information may be received from an external source that has access to proprietary data included in the first data table.

The first information may be structured so as to preserve a privacy of the proprietary data.

The first information may include a respective textual description of each of a plurality of sections of the first data table.

The first set of rules may include at least one from among a programming language of the executable code, a library to be used in conjunction with the executable code, a syntax consideration, and information that relates to a format of the output that reflects an intent of the user.

The processor may be further configured to revise the inquiry based on at least one from among the first set of rules, and to input the revised inquiry into the language model.

The output may include at least one from among a second data table, a sunburst chart, a bar chart, a pie chart, an aggregated answer, a web page, a user interface, a slide presentation, a dashboard, and a document.

The processor may be further configured to receive, from the language model, at least one from among an intermediate representation of the output and a data structure that corresponds to the output.

The processor may be further configured to cause the display to display the output via a GUI.

According to yet another exemplary embodiment, a non-transitory computer readable storage medium storing instructions for generating a first set of executable code is provided. The storage medium includes a second set of executable code which, when executed by a processor, causes the processor to: receive first information that relates to a summarization of a first data table; define a first set of rules for facilitating a generation of executable code by a language model; receive an inquiry from a user; input each of the first information, the first set of rules, and the inquiry into the language model; receive, in response to the input, the first set of executable code that is generated by the language model; and execute the first set of executable code in order to generate an output.

The first information may be received from an external source that has access to proprietary data included in the first data table. The first information may be structured so as to preserve a privacy of the proprietary data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
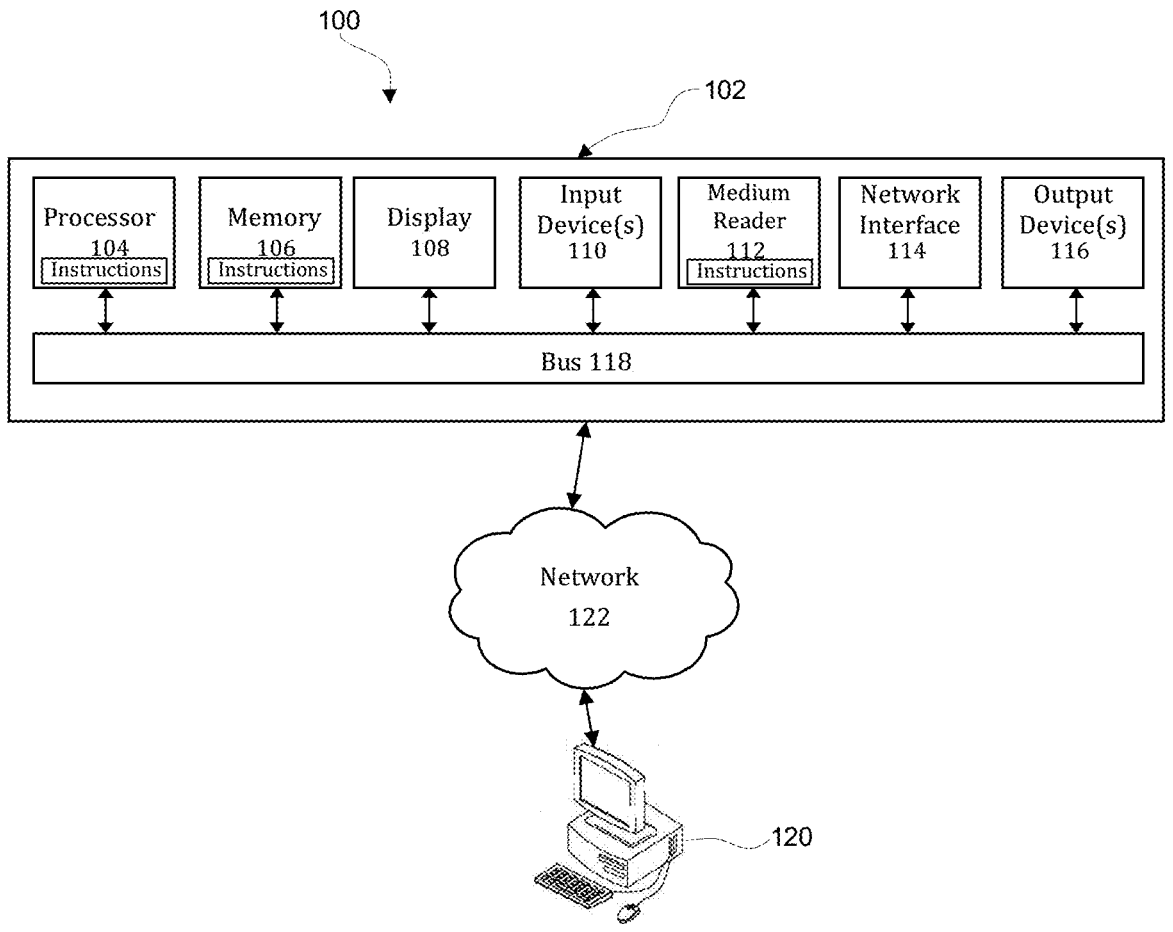
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a large language model to generate executable code in a manner that preserves privacy and confidentiality of proprietary data.

Figure 2:
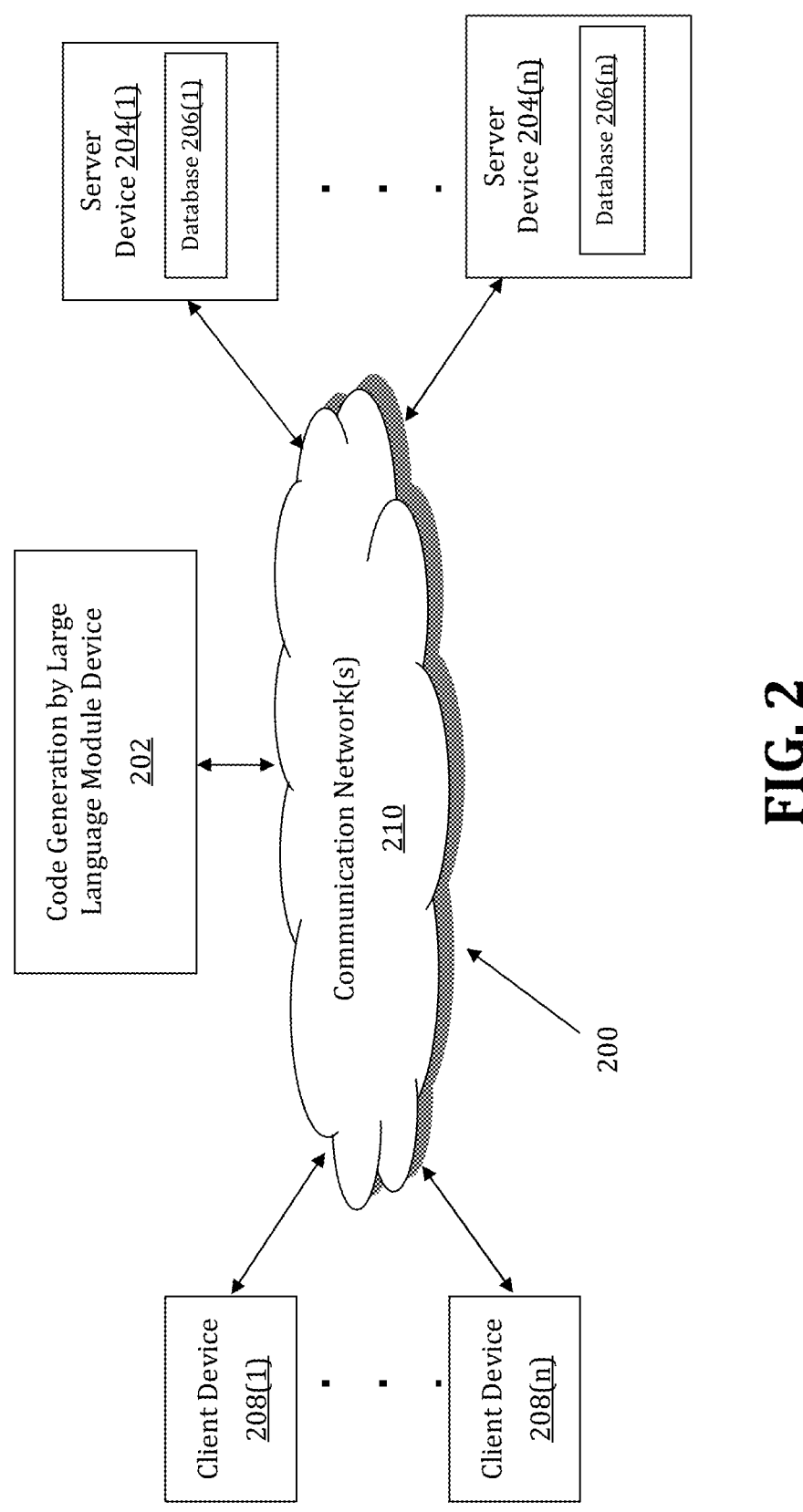
FIG. 2 illustrates an exemplary diagram of a network environment.

Referring to FIG. 2, a schematic of an exemplary network environment 200 for implementing a method for using a large language model to generate executable code in a manner that preserves privacy and confidentiality of proprietary data is illustrated. In an exemplary embodiment, the method is executable on any networked computer platform, such as, for example, a personal computer (PC).

The method for using a large language model to generate executable code in a manner that preserves privacy and confidentiality of proprietary data may be implemented by a Code Generation by Large Language Model (CGLLM) device 202. The CGLLM device 202 may be the same or similar to the computer system 102 as described with respect to FIG. 1. The CGLLM device 202 may store one or more applications that can include executable instructions that, when executed by the CGLLM device 202, cause the CGLLM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CGLLM device 202 itself, may be located in virtual server(s) running in a cloud-based computing environment rather than being tied to one or more specific physical network computing devices. Also, the application(s) may be running in one or more virtual machines (VMs) executing on the CGLLM device 202. Additionally, in one or more embodiments of this technology, virtual machine(s) running on the CGLLM device 202 may be managed or supervised by a hypervisor.

In the network environment 200 of FIG. 2, the CGLLM device 202 is coupled to a plurality of server devices 204(1)-204(n) that hosts a plurality of databases 206(1)-206(n), and also to a plurality of client devices 208(1)-208(n) via communication network(s) 210. A communication interface of the CGLLM device 202, such as the network interface 114 of the computer system 102 of FIG. 1, operatively couples and communicates between the CGLLM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CGLLM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CGLLM devices that efficiently implement a method for using a large language model to generate executable code in a manner that preserves privacy and confidentiality of proprietary data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CGLLM device 202 may be a standalone device or integrated with one or more other devices or apparatuses, such as one or more of the server devices 204(1)-204(n), for example. In one particular example, the CGLLM device 202 may include or be hosted by one of the server devices 204(1)-204(n), and other arrangements are also possible. Moreover, one or more of the devices of the CGLLM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CGLLM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store large language model data and data that relates to summaries, tables, and rules for providing context and structure to a large language model.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CGLLM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CGLLM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CGLLM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CGLLM device 202, the server devices 204(1)-204(n), or the client devices 208(1)-208(n), for example, may be configured to operate as virtual instances on the same physical machine. In other words, one or more of the CGLLM device 202, the server devices 204(1)-204(n), or the client devices 208(1)-208(n) may operate on the same physical device rather than as separate devices communicating through communication network(s) 210. Additionally, there may be more or fewer CGLLM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
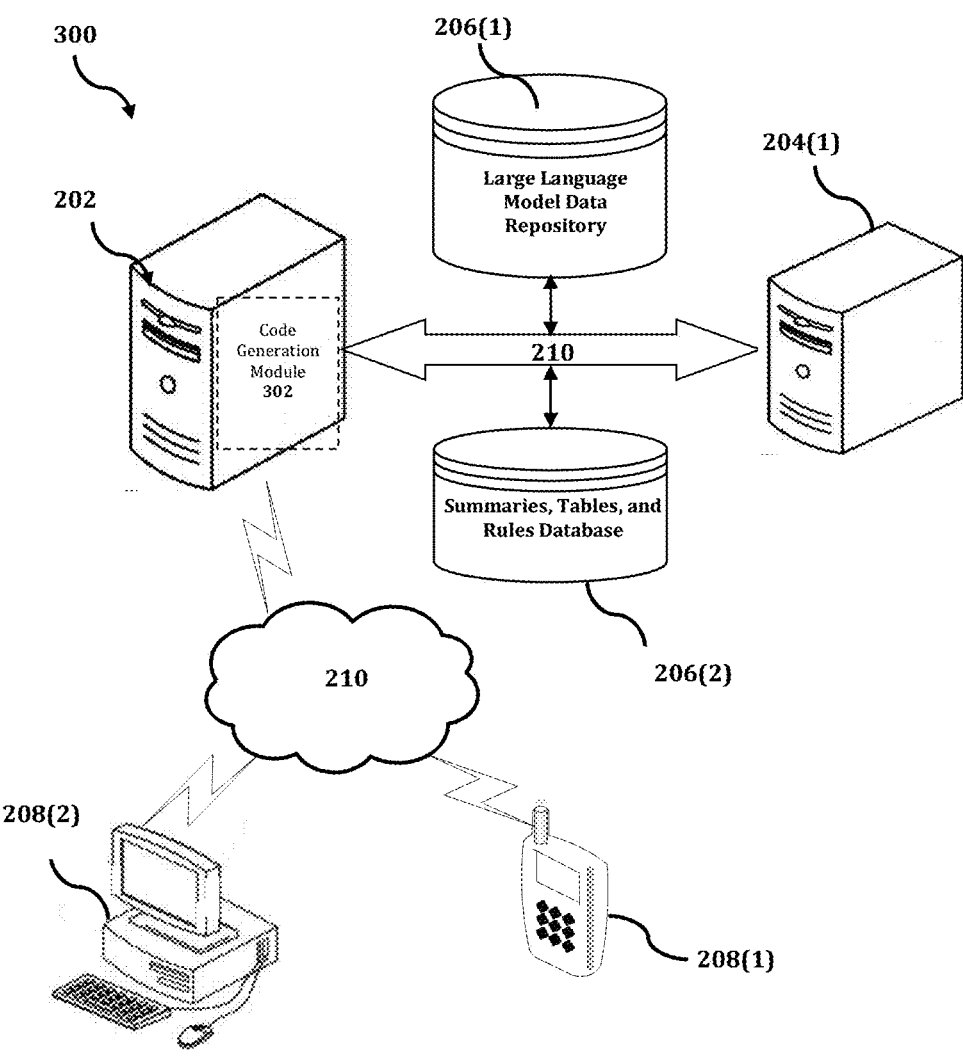
FIG. 3 shows an exemplary system for implementing a method for using a large language model to generate executable code in a manner that preserves privacy and confidentiality of proprietary data.

The CGLLM device 202 is described and illustrated in FIG. 3 as including a code generation module 302, although it may include other rules, policies, modules, databases, or applications, for example. As will be described below, the code generation module 302 is configured to implement a method for using a large language model to generate executable code in a manner that preserves privacy and confidentiality of proprietary data.

An exemplary process 300 for implementing a mechanism for using a large language model to generate executable code in a manner that preserves privacy and confidentiality of proprietary data by utilizing the network environment of FIG. 2 is illustrated as being executed in FIG. 3. Specifically, a first client device 208(1) and a second client device 208(2) are illustrated as being in communication with CGLLM device 202. In this regard, the first client device 208(1) and the second client device 208(2) may be "clients" of the CGLLM device 202 and are described herein as such. Nevertheless, it is to be known and understood that the first client device 208(1) and/or the second client device 208(2) need not necessarily be "clients" of the CGLLM device 202, or any entity described in association therewith herein. Any additional or alternative relationship may exist between either or both of the first client device 208(1) and the second client device 208(2) and the CGLLM device 202, or no relationship may exist.

Further, CGLLM device 202 is illustrated as being able to access a large language model data repository 206(1) and a summaries, tables, and rules database 206(2). The code generation module 302 may be configured to access these databases for implementing a method for using a large language model to generate executable code in a manner that preserves privacy and confidentiality of proprietary data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CGLLM device 202 via broadband or cellular communication. Of course, these embodiments are merely exemplary and are not limiting or exhaustive.

Upon being started, the code generation module 302 executes a process for using a large language model to generate executable code in a manner that preserves privacy and confidentiality of proprietary data. An exemplary process for using a using a large language model to generate executable code in a manner that preserves privacy and confidentiality of proprietary data is generally indicated at flowchart 400 in FIG. 4.

Figure 4:
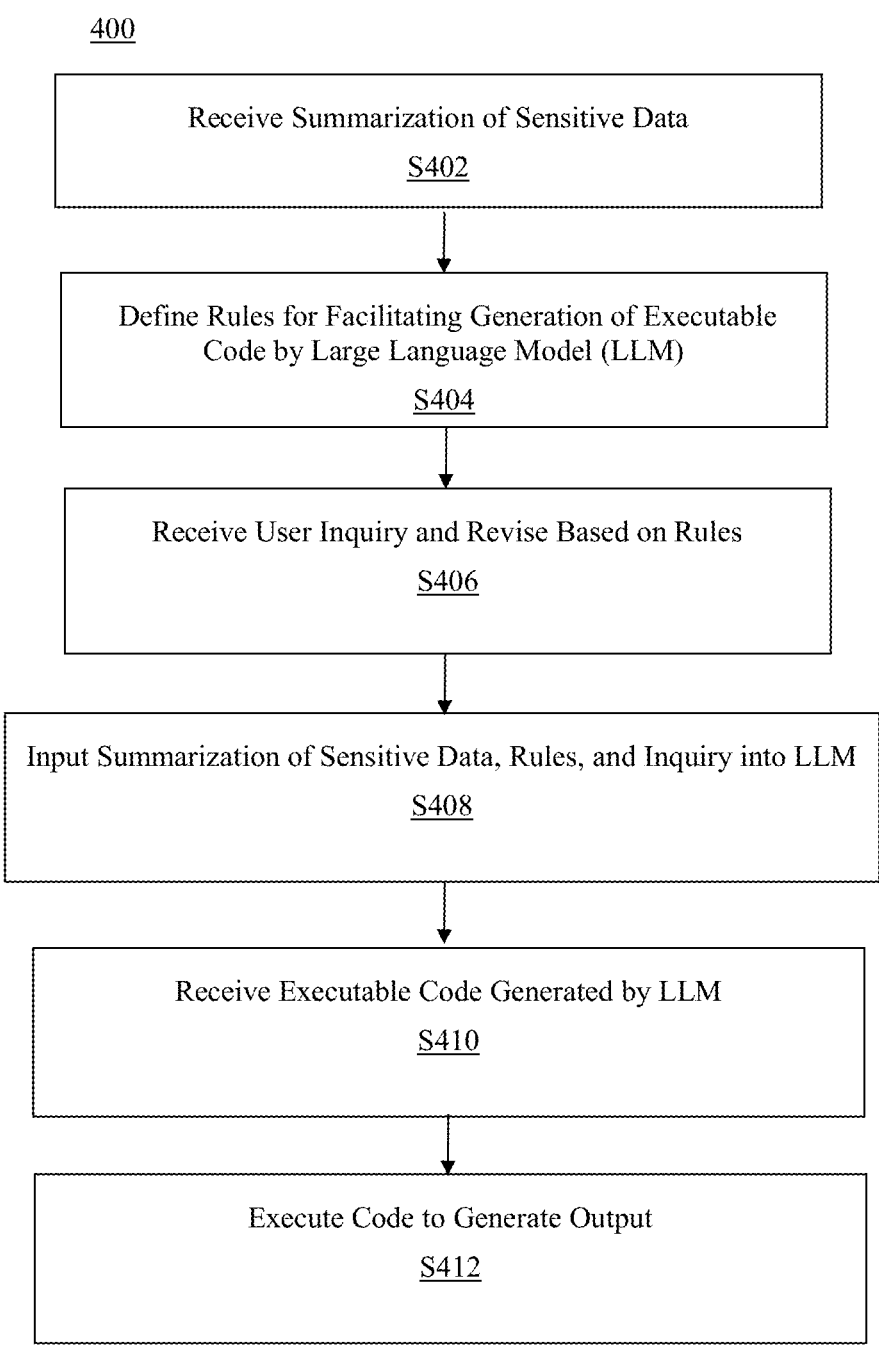
FIG. 4 is a flowchart of an exemplary process for implementing a method for using a large language model to generate executable code in a manner that preserves privacy and confidentiality of proprietary data.

In process 400 of FIG. 4, at step S402, the code generation module 302 receives first information that relates to a summarization of a data table. In an exemplary embodiment, the first information may be received from an external source that has access to sensitive and/or proprietary data that is included in the data table, and the summarization of the data table may be structured so as to preserve a privacy of the sensitive and/or proprietary data. For example, the summarization of the data table may include a textual description of each of a plurality of sections of the data table.

At step S404, the code generation module 302 defines a set of rules that are designed to facilitate a generation of executable code by a language model, such as, for example, an LLM. In an exemplary embodiment, the set of rules may include any one or more of a rule that pertains to a programming language of the executable code to be generated by the LLM, a library to be used in conjunction with the executable code, a syntax consideration, and information that relates to a format of the output that reflects a user intent.

At step S406, the code generation module 302 receives a query and/or an inquiry from a user. Generally, the inquiry relates to a result that the user desires to obtain from the executable code to be generated by the LLM. In an exemplary embodiment, the query or inquiry may be revised based on the rules defined in step S404.

At step S408, the code generation module 302 inputs the summarization of the data table, the rules, and the inquiry and/or revised inquiry to the LLM. Then, at step S410, the code generation module 302 receives executable code that has been generated by the LLM.

At step S412, the code generation module 302 executes the code received in step S410 in order to generate an output. In an exemplary embodiment, the output may include any one or more of a new data table, a sunburst chart, a bar chart, a pie chart, an aggregated answer, a web page, a user interface, a slide presentation, a dashboard, and a document. The execution of the code may also cause a generation of either or both of an intermediate representation of the output and/or a data structure that corresponds to the output. In an exemplary embodiment, the output may be displayed on a display via a GUI.

In an exemplary embodiment, the present disclosure describes a method of leveraging LLMs to generate a "prompt" and executable code without "feeding" any internal data into the models. This is a novel approach for any financial institution to scale the usability of LLMs without exposing any proprietary data.

In an exemplary embodiment, the method and system for generating executable code leverages generative, autoregressive LLMs to produce an output that does not require any proprietary data to be fed into the model but will produce an output that is rooted from such proprietary data. Outputs can be aggregated answers, filtered tables, bar graphs, pie charts, or any other artifact, descriptive or visual, that can be created through code.

In an exemplary embodiment, the system circumvents the need to input any kind of confidential data. The first step involves summarizing the data into an appropriate verbalized form. As LLMs are language models first, they have a keen understanding of intent and context. Summaries can be predefined by human users or generated by a LLM by providing the schema. Multiple tables can be supplied as the context. Second, a definition for a set of rules to improve the structured output of the LLM is provided. This may include what programming language, what code libraries to use, and additional syntax considerations. In addition, the LLM is instructed to supply code that can run on some internal data structure that has the data readily available to produce the desired output of the user's intent. Third, a query is supplied to the context to create a full prompt. The queries can be system-defined or human provided. Possible queries could be structured as a question, such as "What is the total AUM for an asset manager"; queries can be instructive, such as "Give me the top five funds with assets in France"; or queries may be open ended. In addition, the prompt can allow for different output types, such as single answers, tables, graphs, or any other structured output medium that is generated through code (JSON, .csv, etc.) as an optional instruction to follow.

The context is fed into the LLM, which generates code. This code may or may not be inspected by an additional validator that examines the abstract syntax tree and correct for errors. This code can be executed in a programming environment to dynamically generate content, such as tables or sunburst charts. If the code cannot run due to syntax errors, the error may be captured, and the LLM can be prompted to fix the code conditioned on the error message, generated code, and the previous prompt. The successful code run can generate both intermediate representations and data structures plus final outputs. This can be dynamically displayed in a user application effortlessly as native code.

Since LLMs are generative and conversational, a user may or may not provide follow-up instructions to update the dynamically generated content, either to change the style, display, type of output, or to provide further guidance. The LLM can be prompted on the prior inputs and outputs and new guidance, generating new code that may or may not reference artifacts produced in the previous chat cycle. The prior artifacts of a successful code run are also kept locally in memory allowing the code produced to build on top of what has already been created, safely within a firewalled system protecting data privacy.

By providing the description of the data, instructions to follow, and a query for the data, the system can create executable code capable of producing interactive and dynamic outputs in a variety of styles. No internal data is exposed as it is operated on in internal memory on secure computers. In addition, this enables large scale table question answering without incrementally supplying all data points, which can be thousands of samples per table.

This procedure can be extended to the generation of reports, webpages, dashboards, and presentation decks. A system that is using this application as a plug-in or standalone product could allow users, or the system through templates, automatic page segmentation into containers, etc., to define containers or sections to display content. Each container can accept, as input, a supplied query to the data in memory or embedded into the application. In an exemplary embodiment, the system synthesizes code that produces artifacts answering the query or instruction. This is replicable on a per-container basis, and then sized to fit within the container. For instance, a user may use the system to build custom dashboards by outlining the frame and providing natural language instruction to each container. With dynamically produced outputs from code that can be rendered as HTML, JSON, images, and tables, each container can then rerun the generated code on any data refresh.

For instance, suppose a user desires to build a custom dashboard to display a company's private funds and their administrators. The user could create four containers where the first container would answer "Provide me a table of funds sorted by gross asset value", the second container would answer "What are the top 15 domiciles by gross asset value?", the third could answer "What are the top 15 administrators by gross asset value, as a sunburst chart?", and finally the fourth could be "Provide me a sorted bar chart that displays how many funds are administered per administrator". In this scenario, the system executes each container to produce generated code—which would be a set of programmatic instructions that can be executed and rerun on internal data at will without transmitting the data to any outside API. Each container executes the code and renders the output artifacts in the designated space. These, in the case of a webpage or dashboard, HTML-embedded charts and tables could be produced from the code, or for presentations and documents, an image of the graph or a table could be generated. Users could fix the underlying code generated, if need be through the UI, or rewrite the query and generate again.

Figure 5:
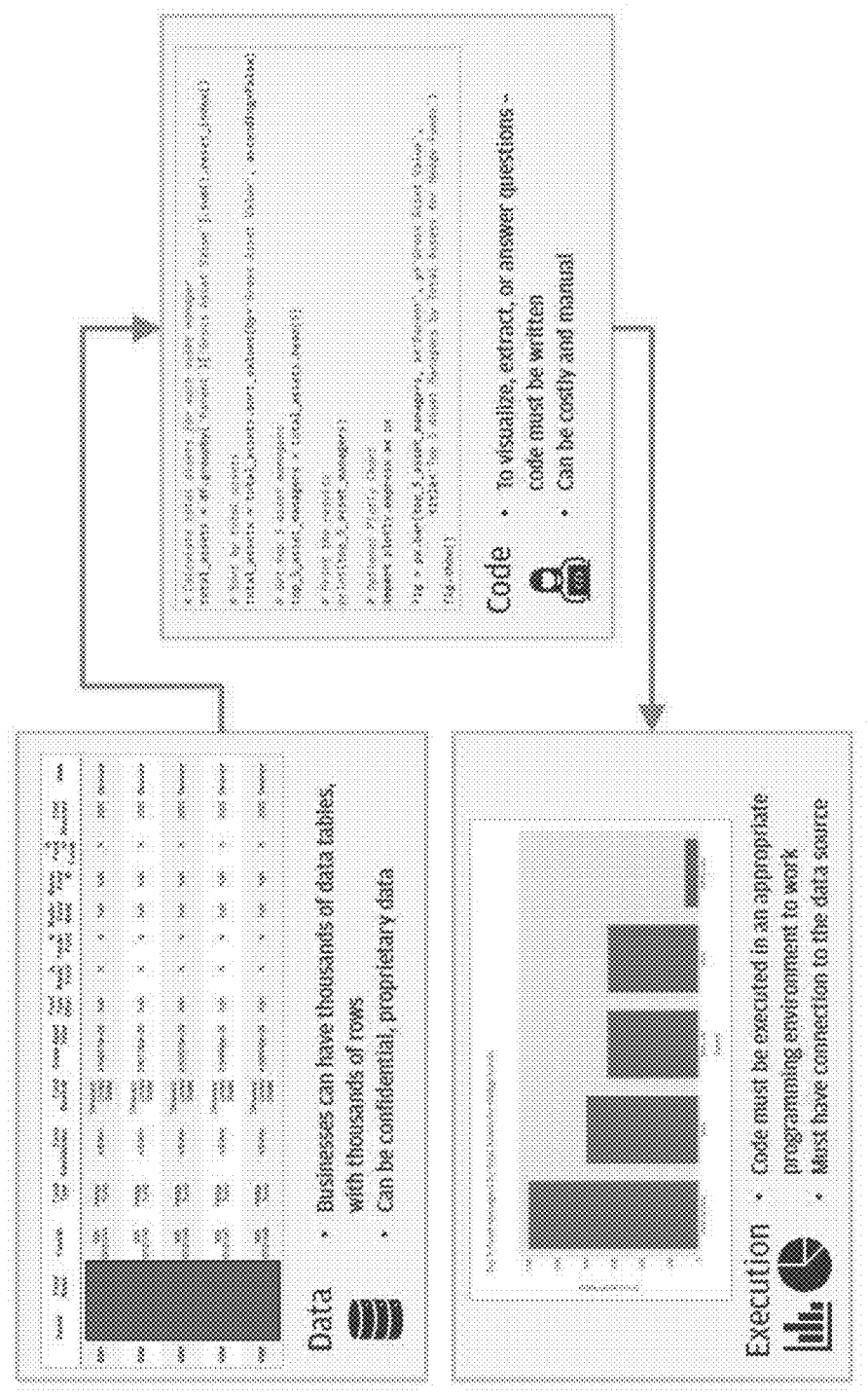
FIG. 5 is a diagram that illustrates a data-code-execution flow and common pitfalls that are addressable by implementing a method for using a large language model to generate executable code in a manner that preserves privacy and confidentiality of proprietary data, according to an exemplary embodiment.

FIG. 5 is a diagram 500 that illustrates a data-code-execution flow and common pitfalls that are addressable by implementing a method for using a large language model to generate executable code in a manner that preserves privacy and confidentiality of proprietary data, according to an exemplary embodiment. Companies can have massive amounts of data that A) are confidential or proprietary, and B) too large to send into a model. Therefore, in an exemplary embodiment, the present disclosure proposes the use of LLMs to generate code as a set of sequential operations to be applied on this data within internal systems. Common pitfalls that are addressed by this methodology are illustrated in diagram 500.

Figure 6:
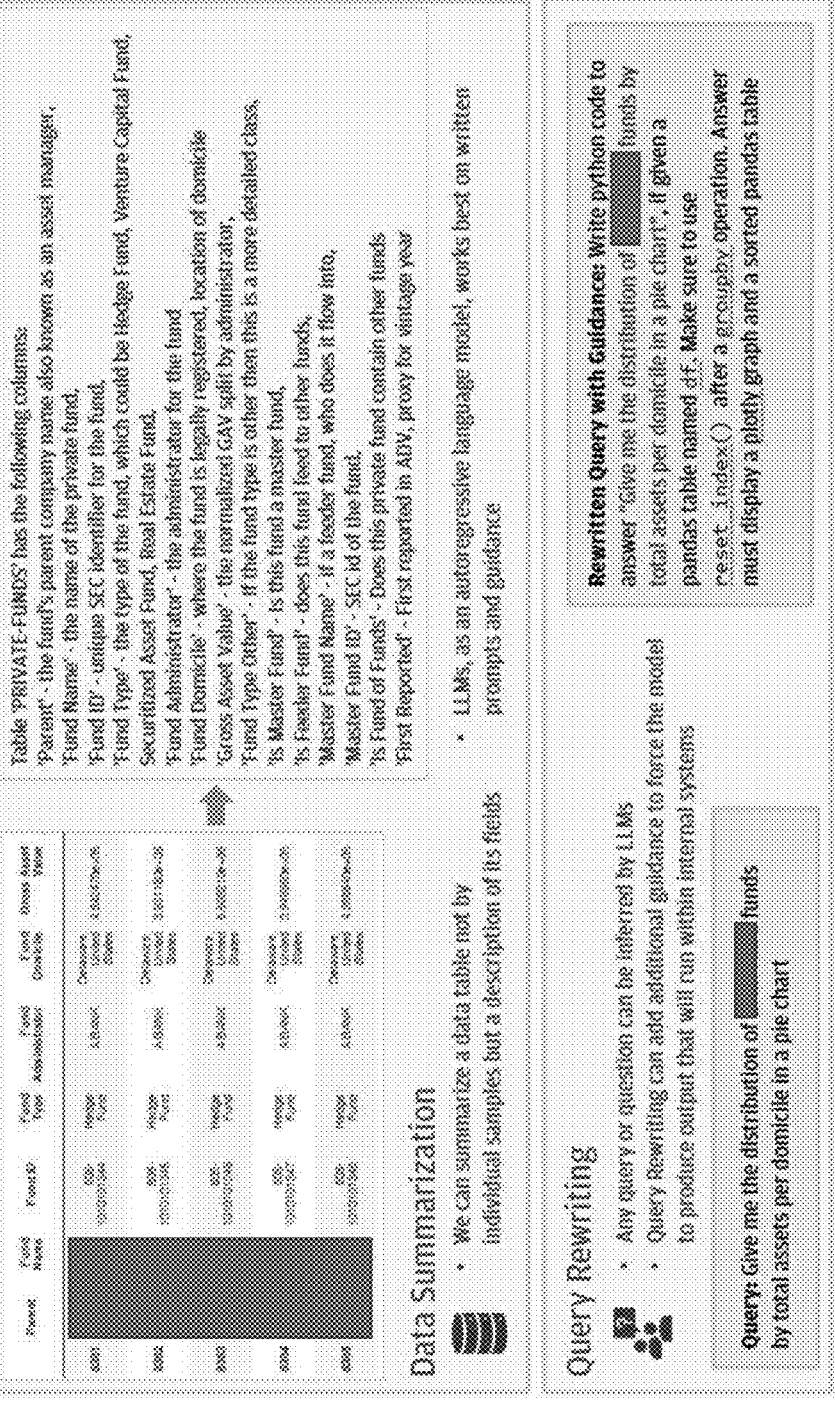
FIG. 6 is a diagram that illustrates an example of converting a table into a natural language description as part of a method for using a large language model to generate executable code in a manner that preserves privacy and confidentiality of proprietary data, according to an exemplary embodiment.

FIG. 6 is a diagram 600 that illustrates an example of converting a table into a natural language description as part of a method for using a large language model to generate executable code in a manner that preserves privacy and confidentiality of proprietary data, according to an exemplary embodiment. As shown in diagram 600, an example of converting a table into a natural language description based upon what information the table can provide, what columns represent the table, and how to use those columns. In addition, this method can help with data discovery. The diagram 600 also outlines a sample query and how the system can provide additional rules and context to guide the code generation to work flawlessly within the system.

Figure 7:
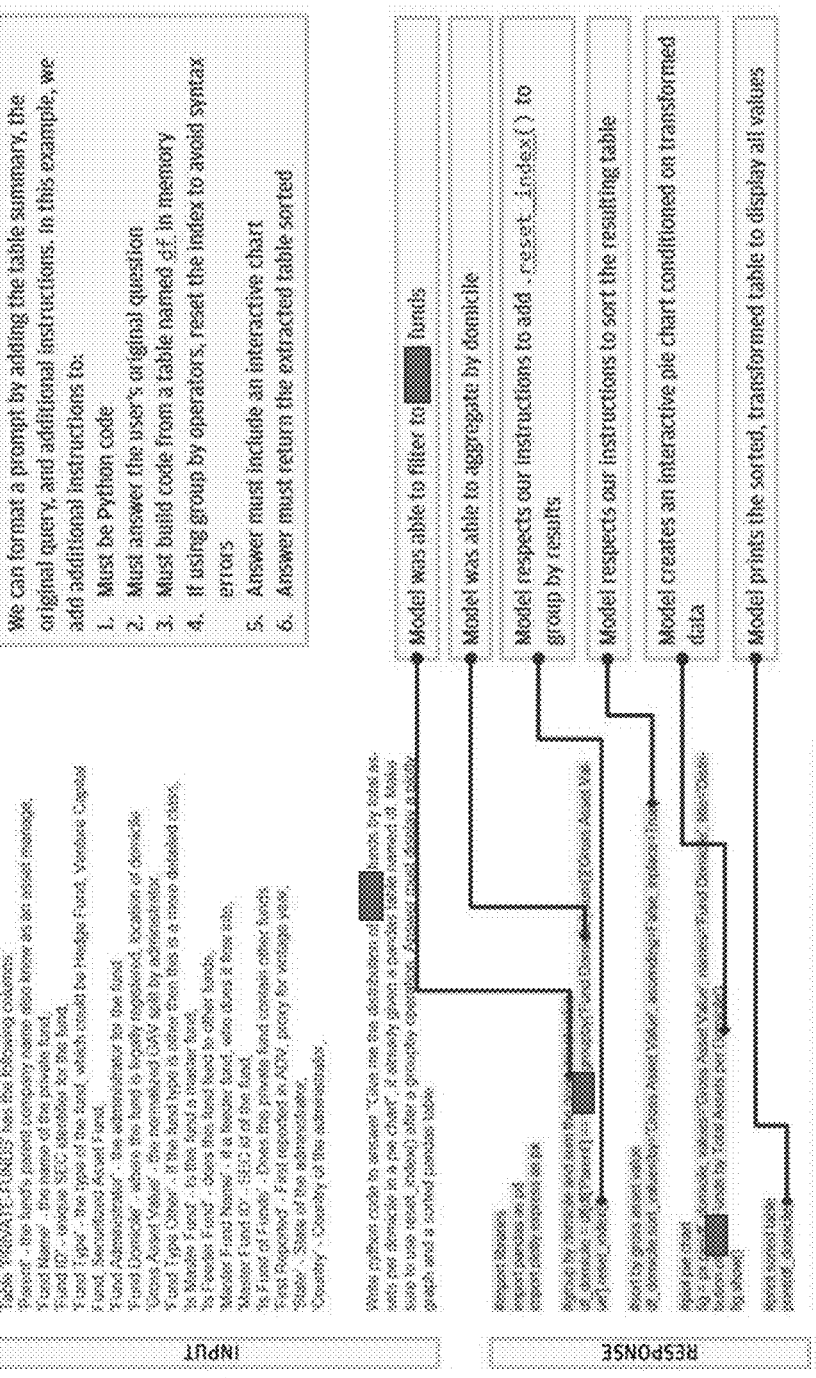
FIG. 7 is a diagram that illustrates a sample input and generated response that result from an execution of a method for using a large language model to generate executable code in a manner that preserves privacy and confidentiality of proprietary data, according to an exemplary embodiment.

FIG. 7 is a diagram 700 that illustrates a sample input and generated response that result from an execution of a method for using a large language model to generate executable code in a manner that preserves privacy and confidentiality of proprietary data, according to an exemplary embodiment. LLMs can transform user intent into actionable code to operate on data, without an exposure of a single data point. Diagram 700 highlights how the model follows additional instructions within the prompt.

Figure 8:
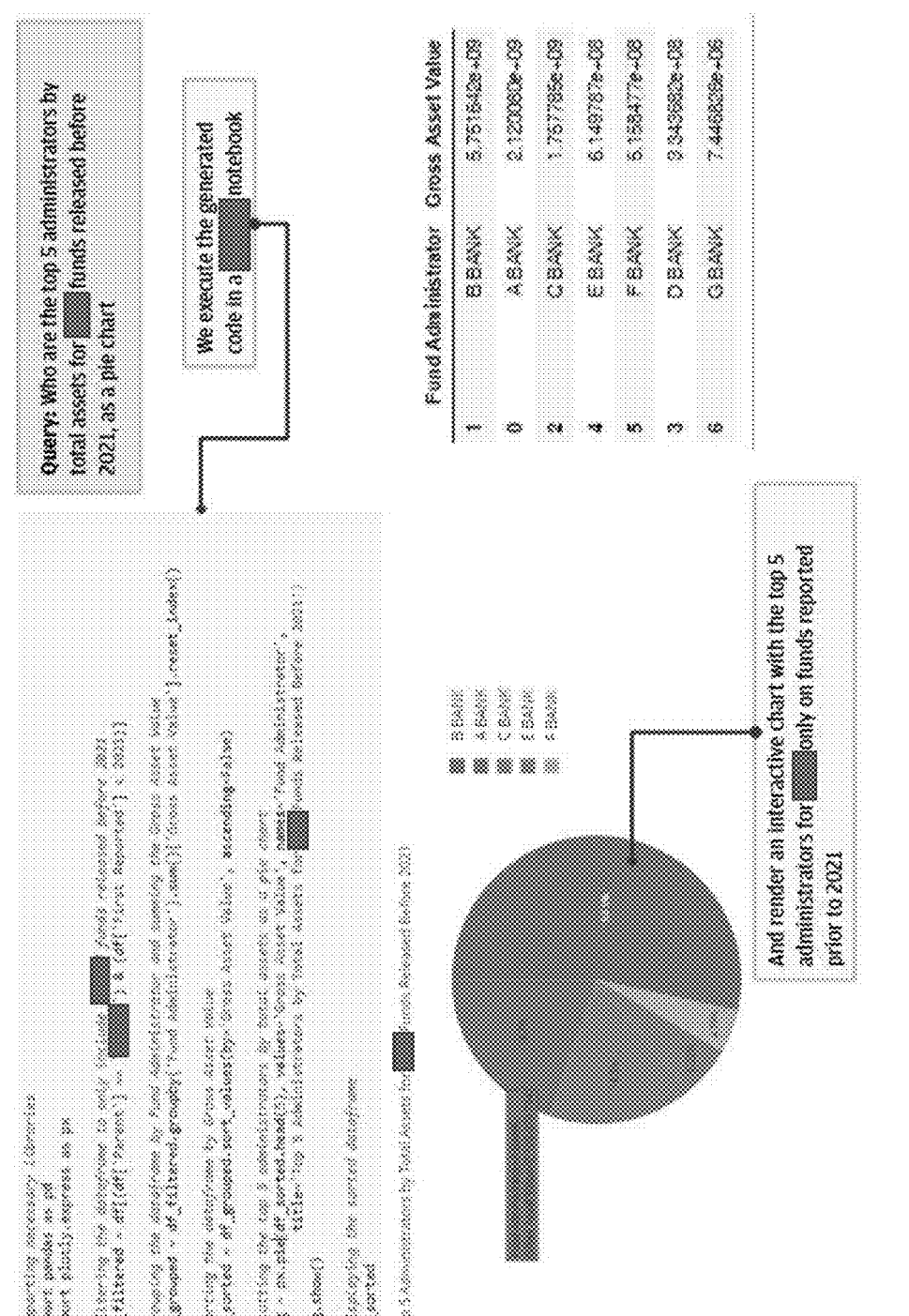
FIG. 8 is a diagram that illustrates a sample flowchart of a pipeline for a single completion after prompting that is generated by an execution of a method for using a large language model to generate executable code in a manner that preserves privacy and confidentiality of proprietary data, according to an exemplary embodiment.

FIG. 8 is a diagram 800 that illustrates a sample flowchart of a pipeline for a single completion after prompting that is generated by an execution of a method for using a large language model to generate executable code in a manner that preserves privacy and confidentiality of proprietary data, according to an exemplary embodiment. An API call, function call, or any interface to a LLM model, whether internal or external, can be used to synthesize code. The output can be captured, validated, and executed within an environment. This can generate visuals that can be embedded into webpages, user interfaces, presentations, dashboards, or documents. The output can be static (e.g., images) or dynamic (e.g., embedded HyperText Markup Language) as a byproduct of producing structures from code.

Figure 9:
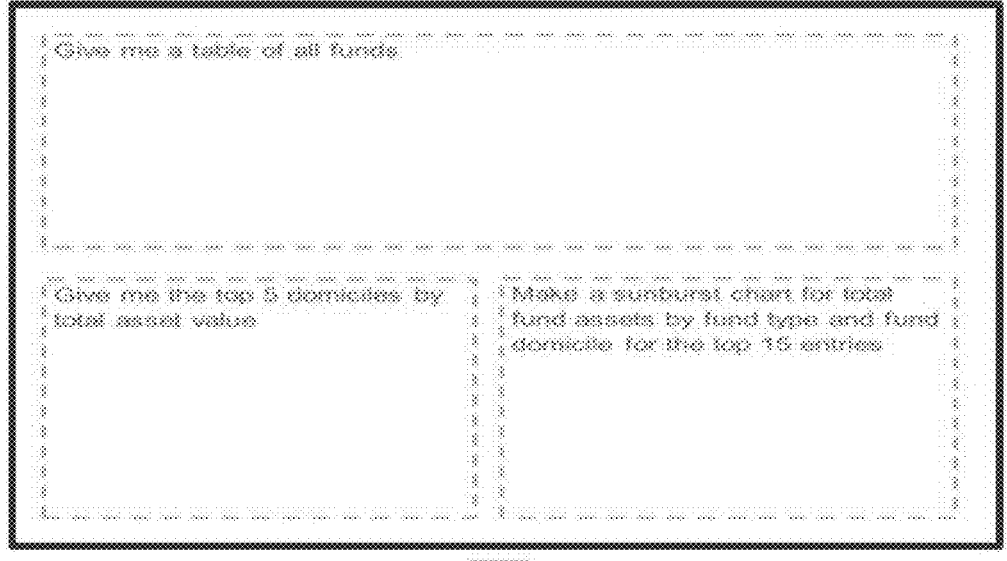
FIG. 9 is a diagram that illustrates a sample of outlining containers with natural language instructions to generate dynamic dashboards from an internal data source that results from an execution of a method for using a large language model to generate executable code in a manner that preserves privacy and confidentiality of proprietary data, according to an exemplary embodiment.
Figure 9:
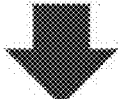
Figure 9:
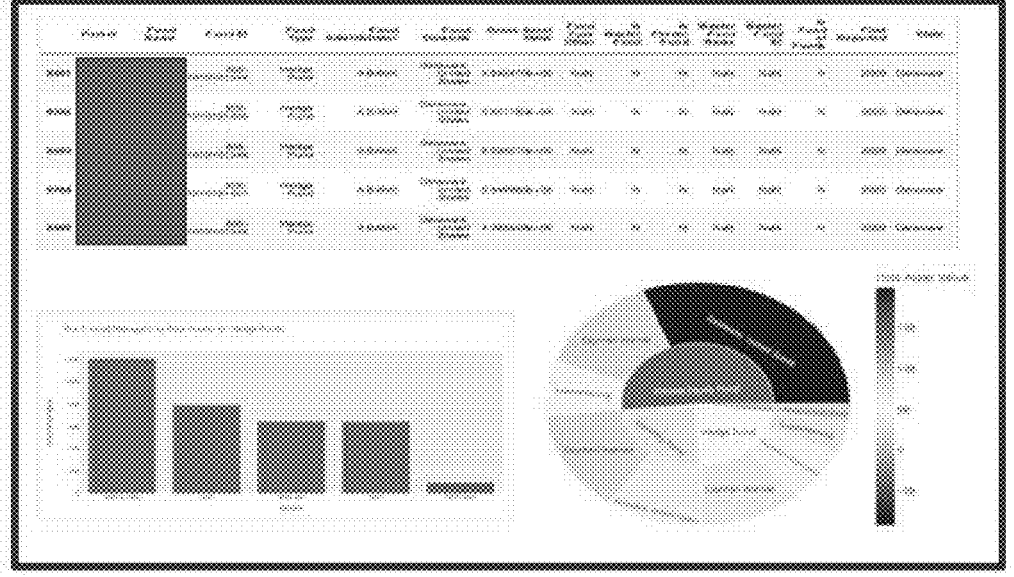

FIG. 9 is a diagram 900 that illustrates a sample of outlining containers with natural language instructions to generate dynamic dashboards from an internal data source that results from an execution of a method for using a large language model to generate executable code in a manner that preserves privacy and confidentiality of proprietary data, according to an exemplary embodiment. Each container can store the instruction, code, be modified by the user, rerun the code, refresh the data, possibly linked to the other containers as a filter, and freely moved around as an floating object to a new position on the screen.

Accordingly, with this technology, a process for using a large language model to generate executable code in a manner that preserves privacy and confidentiality of proprietary data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating executable code, the method being implemented by at least one processor, the method comprising:

receiving, by the at least one processor and from an external source, first information that relates to a summarization of a first data table, wherein the external source has access to proprietary data that is included in the first data table, and wherein the summarization includes a textual description of each of a plurality of sections of the first data table;

defining, by the at least one processor, a first set of rules for facilitating a generation of executable code by a language model, wherein the first set of rules include at least one rule that pertains to a programming language of the executable code, a library to be used in conjunction with the executable code, and information relating to a format of an output that reflects a user intent;

receiving, by the at least one processor, an inquiry from a user;

revising, by the at least one processor, the inquiry received based on the at least one rule included in the first set of rules;

inputting, by the at least one processor, each of the first information, the first set of rules, and the revised inquiry into the language model, wherein the inputted first information omits the proprietary data included in the first data table;

receiving, by the at least one processor in response to the inputting, a first set of executable code that is generated by the language model; and executing, by the at least one processor, the first set of executable code in order to generate the output that does not include the proprietary data included in the first data table but is rooted from the proprietary data included in the first data table.

2. The method of claim 1, wherein the first information is structured so as to preserve a privacy of the proprietary data.

3. The method of claim 1, further comprising inspecting, by a validator, the first set of executable code by examining an abstract syntax tree associated with the first set of executable code.

4. The method of claim 1, wherein the output includes at least one from among a second data table, a sunburst chart, a bar chart, a pie chart, an aggregated answer, a web page, a user interface, a slide presentation, a dashboard, and a document.

5. The method of claim 1, wherein the executing of the first set of executable code causes a generation of at least one from among an intermediate representation of the output and a data structure that corresponds to the output.

6. The method of claim 1, further comprising displaying the output on a display via a graphical user interface (GUI).

7. A computing apparatus for generating executable code, the computing apparatus comprising:

a processor;

a memory;

a display; and a communication interface coupled to each of the processor, the memory, and the display, wherein the processor is configured to:

receive, via the communication interface and from an external source, first information that relates to a summarization of a first data table, wherein the external source has access to proprietary data that is included in the first data table, and wherein the summarization includes a textual description of each of a plurality of sections of the first data table;

define a first set of rules for facilitating a generation of executable code by a language model, wherein the first set of rules include at least one rule that pertains to a programming language of the executable code, a library to be used in conjunction with the executable code, and information relating to a format of an output that reflects a user intent;

receive, via the communication interface, an inquiry from a user;

revise the inquiry received based on the at least one rule included in the first set of rules;

input each of the first information, the first set of rules, and the revised inquiry into the language model, wherein the inputted first information omits the proprietary data included in the first data table;

receive, in response to the input via the communication interface, a first set of executable code that is generated by the language model; and execute the first set of executable code in order to generate the output that does not include the proprietary data included in the first data table but is rooted from the proprietary data included in the first data table.

8. The computing apparatus of claim 7, wherein the first information is structured so as to preserve a privacy of the proprietary data.

9. The computing apparatus of claim 7, wherein the processor is further configured to inspect, via a validator, the first set of executable code by examining an abstract syntax tree associated with the first set of executable code.

10. The computing apparatus of claim 7, wherein the output includes at least one from among a second data table, a sunburst chart, a bar chart, a pie chart, an aggregated answer, a web page, a user interface, a slide presentation, a dashboard, and a document.

11. The computing apparatus of claim 7, wherein the processor is further configured to receive, from the language model, at least one from among an intermediate representation of the output and a data structure that corresponds to the output.

12. The computing apparatus of claim 7, wherein the processor is further configured to cause the display to display the output via a graphical user interface (GUI).

13. A non-transitory computer readable storage medium storing instructions for generating a first set of executable code, the storage medium comprising a second set of executable code which, when executed by a processor, causes the processor to:

receive, from an external source, first information that relates to a summarization of a first data table, wherein the external source has access to proprietary data that is included in the first data table, and wherein the summarization includes a textual description of each of a plurality of sections of the first data table;

define a first set of rules for facilitating a generation of executable code by a language model, wherein the first set of rules include at least one rule that pertains to a programming language of the executable code, a library to be used in conjunction with the executable code, and information relating to a format of an output that reflects a user intent;

receive an inquiry from a user;

revise the inquiry received based on the at least one rule included in the first set of rules;

input each of the first information, the first set of rules, and the revised inquiry into the language model, wherein the inputted first information omits the proprietary data included in the first data table;

receive, in response to the input, the first set of executable code that is generated by the language model; and execute the first set of executable code in order to generate the output that does not include the proprietary data included in the first data table but is rooted from the proprietary data included in the first data table.

* * * * *